(12) United States Patent
Venderbosch et al.

(10) Patent No.: US 7,166,687 B2
(45) Date of Patent: Jan. 23, 2007

(54) TRANSLUCENT THERMOPLASTIC COMPOSITION, METHOD FOR MAKING THE COMPOSITION AND ARTICLES MOLDED THERE FROM

(75) Inventors: Robert W. Venderbosch, Bergen op Zoom (NL); Jan-Willem Goedmakers, Putte (NL); Jeremy D. Hurst, Rotterdam (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/783,140

(22) Filed: Feb. 20, 2004

(65) Prior Publication Data

US 2005/0187372 A1 Aug. 25, 2005
US 2006/0014919 A9 Jan. 19, 2006

Related U.S. Application Data

(60) Provisional application No. 60/448,815, filed on Feb. 21, 2003.

(51) Int. Cl.
*C08G 64/00* (2006.01)

(52) U.S. Cl. .................. 528/196; 525/469; 528/10; 528/38; 528/198

(58) Field of Classification Search .............. 528/10, 528/38, 196, 198; 525/469
See application file for complete search history.

(56) References Cited

U.S. PATENT DOCUMENTS

| | | | |
|---|---|---|---|
| 2,465,319 A | 3/1949 | Whinfield et al. ............ 260/75 |
| 3,047,539 A | 7/1962 | Pengilly ...................... 260/75 |
| 3,476,627 A | 11/1969 | Squires ...................... 156/244 |
| 3,565,985 A | 2/1971 | Schrenk et al. ............ 264/171 |
| 3,635,895 A | 1/1972 | Kramer ................. 260/47 XA |
| 3,668,288 A | 6/1972 | Takahashi .................... 264/47 |
| 3,918,865 A | 11/1975 | Nissel ...................... 425/131.1 |
| 3,933,964 A | 1/1976 | Brooks ....................... 264/171 |
| 4,001,184 A | 1/1977 | Scott .................... 260/47 XA |
| 4,217,438 A | 8/1980 | Brunelle et al. ............ 528/202 |
| 4,254,775 A | 3/1981 | Langer ................... 128/419 D |
| 4,477,521 A | 10/1984 | Lehmann et al. ........... 428/336 |
| 4,565,684 A | 1/1986 | Tibbetts et al. .......... 423/447.3 |
| 4,572,813 A | 2/1986 | Arakawa ................... 264/29.2 |
| 4,579,906 A | 4/1986 | Zabrocki et al. ............... 525/72 |
| 4,663,230 A | 5/1987 | Tennent ...................... 428/367 |
| 4,707,393 A | 11/1987 | Vetter ......................... 428/178 |
| 4,816,289 A | 3/1989 | Komatsu et al. ......... 423/447.3 |
| 4,876,078 A | 10/1989 | Arakawa et al. ......... 423/447.3 |
| 5,024,818 A | 6/1991 | Tibbetts et al. ............. 422/158 |
| 5,165,909 A | 11/1992 | Tennent et al. .......... 423/447.3 |
| 5,521,230 A | 5/1996 | Bhatia et al. ................ 523/328 |
| 5,530,083 A | 6/1996 | Phelps et al. |
| 5,589,152 A | 12/1996 | Tennent et al. .......... 423/447.3 |
| 5,591,382 A | 1/1997 | Nahass et al. .............. 252/511 |
| 5,916,980 A * | 6/1999 | Ogawa et al. .............. 525/464 |
| 6,066,700 A * | 5/2000 | Konig et al. ................ 525/464 |
| 6,625,379 B1 * | 9/2003 | Azuma ....................... 385/146 |
| 6,676,852 B1 * | 1/2004 | Brown et al. .......... 252/301.36 |
| 6,727,302 B1 * | 4/2004 | Goossens et al. ........... 524/161 |
| 2004/0132865 A1 * | 7/2004 | Gohr et al. ................. 523/351 |
| 2005/0119370 A1 | 6/2005 | Paul et al. |

FOREIGN PATENT DOCUMENTS

| | | |
|---|---|---|
| EP | 0 524 731 A1 | 6/1992 |
| EP | 0 604 130 A2 | 12/1993 |
| EP | 0 864 599 A2 | 2/1998 |
| GB | 2 043 083 A | 1/1980 |

OTHER PUBLICATIONS

UL 94, ISBN 0-7629-0082-2, "Tests for Flammability of Plastic Materials for Parts in Devices and Appliances", Dec. 12, 2003.
ASTM D 1003-00, Standard Test Method for Haze and Luminous Transmittance of Transparent Plastics, 6 pages.

* cited by examiner

*Primary Examiner*—Terressa Boykin

(57) ABSTRACT

A thermoplastic composition comprising a matrix of a polycarbonate polymer in which are embedded polysiloxane domains with an average domain size between 20 and 45 nanometers. Said compositions can be obtained by combining a first polycarbonate/poly(diorganosiloxane) copolymer; with a second polycarbonate/poly(diorganosiloxane) copolymer. A range of translucencies are obtainable by varying the relative amounts of the two copolymers without substantial loss in impact properties.

26 Claims, No Drawings

TRANSLUCENT THERMOPLASTIC COMPOSITION, METHOD FOR MAKING THE COMPOSITION AND ARTICLES MOLDED THERE FROM

CROSS-REFERENCE TO RELATED APPLICATIONS

This application claims the benefit of U.S. Patent Application Ser. No. 60/448,815, filed Feb. 21, 2003.

BACKGROUND OF THE INVENTION

The disclosure relates to a thermoplastic composition comprising polycarbonate polymers. The thermoplastic composition is translucent and has excellent physical properties. The thermoplastic composition comprises a matrix of a polycarbonate polymer in which are embedded polysiloxane domains.

Polycarbonate polymers are transparent engineering thermoplastic materials that combine desirable mechanical, optical, thermal, and electrical properties. Frequently polycarbonate polymers are blended with other materials to improve some mechanical properties such as impact resistance. The resulting blend typically exhibits reduced transparency or even opacity when compared to polycarbonate. In fact, transparency can be lost upon the addition of even small amounts of rubbery impact modifier. There is a growing need for translucent materials. Translucency occupies the middle ground between transparency and opacity, and is generally characterized by a combination of light transmission and haze. Currently available polycarbonate materials typically exhibit a certain level of translucency or opacity which cannot be manipulated over a visually significant range, without a significant variation in composition and physical properties.

There is an unprecedented demand for plastics having unique colors and looks. For example, cellular telephones having interchangeable plastic covers are now commonly available. These covers come in a variety of colors and/or special effects, giving consumers control over the aesthetic design of their phones. Many other injection molded plastic products used in applications such as, for example, computers, laptops, stereos and other consumer and/or business equipment, automotive interiors, etc., would also benefit from having unique colors and looks. Color and a variety of aesthetic effects such as sparkle, glitter, metal-like look, true metal appearance and other angular metameric effects are produced in thermoplastic compositions through the use of visual effect additives. Manipulation or fine tuning the color depth or visual effect requires control of the translucency of the polymer matrix.

The incorporation of visual effect additives can have a significant impact on a number of aesthetic and physical properties. The inclusion of visual effects additives can often decrease the impact strength of the material. Additionally, the incorporation of visual effect additives can result in visible flowlines, knitlines or weldlines in the finished product. Such flowlines, knitlines or weldlines can produce unattractive streaks in the product.

There remains a need for a thermoplastic composition with variable translucency that has excellent physical properties even in the presence of visual effects additives, especially at low temperatures.

BRIEF SUMMARY OF THE INVENTION

Disclosed herein are several embodiments of a thermoplastic composition, a method for its preparation, and articles derived from it.

In one embodiment the thermoplastic composition comprises a matrix of a polycarbonate polymer in which are embedded polysiloxane domains with an average domain size between 20 and 45 nanometers or even 20–40 or 25–40 nanometers.

In another embodiment the thermoplastic composition comprises a matrix of a polycarbonate polymer in which are embedded polysiloxane domains with an average domain size between 20 and 45 nanometers or even 20–40 or 25–40 nanometers and a visual effects additive.

The composition can be obtained by blending two different types of polycarbonate/poly(diorganosiloxane) copolymers.

In another embodiment, a thermoplastic composition comprises a first polycarbonate/poly(diorganosiloxane) copolymer having a first light transmittance and a first haze and a second polycarbonate/poly(diorganosiloxane) copolymer having a second light transmittance and a second haze, wherein the first haze is not equal to the second haze and/or the first light transmittance is not equal to the second light transmittance and the composition has a light transmittance of about 25 to about 95%, preferably about 25 to about 85% and a haze less than about 104.

In another embodiment, a thermoplastic composition comprises a first polycarbonate/poly(diorganosiloxane) copolymer having a first light transmittance and a first haze and a second polycarbonate/poly(diorganosiloxane) copolymer having a second light transmittance and a second haze; wherein the first haze and the second haze have an absolute difference of at least about 50.

In another embodiment, a thermoplastic composition comprises a first polycarbonate/poly(diorganosiloxane) copolymer having a first light transmittance and a first haze and a second polycarbonate/poly(diorganosiloxane) copolymer having a second light transmittance and a second haze, wherein the first light transmittance and the second light transmittance have an absolute difference of at least about 10%.

In another embodiment, a thermoplastic composition comprises a first polycarbonate/poly(diorganosiloxane) copolymer having a first light transmittance of about 0% to about 55% and a first haze of about 45 to about 104 and a second polycarbonate/poly(diorganosiloxane) copolymer having a second light transmittance of about 55 to about 100% and a second haze of 0 to about 45 wherein the first haze does not equal the second haze.

In another embodiment, a thermoplastic composition comprises a first polycarbonate/poly(diorganosiloxane) copolymer having a first light transmittance of about 0% to about 55% and a first haze of about 45 to about 104 and a second polycarbonate/poly(diorganosiloxane) copolymer having a second light transmittance of about 55 to about 100% and a second haze of 0 to about 45 wherein the first light transmittance does not equal the second light transmittance.

In another embodiment, a method of obtaining a desired degree of translucency in a thermoplastic composition comprises combining a first polycarbonate/poly(diorganosiloxane copolymer) having a first light transmittance and a first haze with a second polycarbonate/poly(diorganosiloxane) copolymer having a second light transmittance and a second haze, wherein the first haze is not equal to the second haze and/or the first light transmittance is not equal to the second light transmittance and the composition has a light transmittance of about 25 to about 95%, preferably of about 25 to about 85% and a haze less than about 104.

In another embodiment, a thermoplastic composition comprises a first polycarbonate/poly(diorganosiloxane) copolymer having a first light transmittance and a first haze; a second polycarbonate/poly(diorganosiloxane) copolymer having a second light transmittance and a second haze; and a visual effects additive, wherein the first haze is not equal to the second haze and/or the first light transmittance is not equal to the second light transmittance.

Still other embodiments are articles comprising the polycarbonate copolymer composition and a method for making the claimed compositions.

DETAILED DESCRIPTION OF THE PREFERRED EMBODIMENTS

In a first embodiment the invention deals with a thermoplastic composition comprising a matrix of a polycarbonate polymer in which are embedded polysiloxane domains with an average domain size between 20 and 45 nanometer, or 20–40 or even 25 to 40 nanometers.

Thermoplastic compositions of the invention may be obtained by blending two or more polycarbonate/poly(diorganosiloxane) copolymers. The mixture of polycarbonate/poly(diorganosiloxane) copolymers may further be blended with a polycarbonate. Theoretically it will be possible also to obtain a polycarbonate/poly(diorganosiloxane) copolymer with a polycarbonate matrix and the desired embedded polysiloxane domains by direct synthesis.

In a blend of two polycarbonate/poly(diorganosiloxane) copolymers the individual copolymers are difficult to separate or to distinguish. With Transmission Electron Microscopy (TEM) it is however possible to distinguish in the blend a polycarbonate matrix and embedded polysiloxane domains.

The invention also covers the blends of two or more polycarbonate/poly(diorganosiloxane) copolymers as defined herein.

A translucent thermoplastic composition may comprise a first polycarbonate/poly(diorganosiloxane) copolymer having a first light transmittance and a first haze and a second polycarbonate/poly(diorganosiloxane) copolymer having a second light transmittance and, a second haze, wherein the first haze is not equal to the second haze and/or the first light transmittance is not equal to the second light transmittance. Use of the terms first and second are for identification purposes only and are not meant to imply any form of sequential ordering.

The combination of the first and second copolymers yields a translucent composition that is remarkable for its ability to achieve varying degrees of translucency depending on the amounts of the first and second copolymer in combination with good physical properties, such as impact strength. Translucency is herein defined as having a light transmission of about 25 to about 85% and a haze less than about 104. All light transmission and haze values referred to herein are measured by ASTM D1003 at a thickness of 3.2 millimeters. The priority document of this application refers erroneously to a thickness value of 4.0 millimeters. The varying degrees of translucency may be combined in a variety of ways with visual effects additives to achieve a range of aesthetically desirable visual effects. The claimed compositions with or without visual effect additives may optionally further comprise a polycarbonate resin, a fire retardant, an anti-drip agent, an impact modifier, a cycloaliphatic polyester or a combination of any two or more of the foregoing. The thermoplastic compositions exhibit good impact strength, flammability and low weld line visibility.

The composition generally comprises 1–15% or 2–9% by weight of polydimethyl siloxane units or the equivalent molar amount of other polydiorgano siloxane units calculated with respect to the weight of the total composition.

The polycarbonate/poly(diorganosiloxane) copolymers comprise polycarbonate blocks and poly(diorganosiloxane) blocks. The polycarbonate blocks comprise repeating structural units of the formula (I):

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexylmethylene 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

The poly(diorganosiloxane) blocks comprise repeating structural units of the formula (III)

wherein each occurrence of $R^2$ may be the same or different and is selected from $C_{(1-13)}$ monovalent organic radicals, and n is an integer greater than or equal to 1, preferably greater than or equal to about 10, more preferably greater than or equal to about 25 and most preferably greater than or equal to about 40. It is desirable to have n be an integer less then or equal to about 1000, preferably less than or equal to about 100, more preferably less than or equal to about 75 and most preferably less than or equal to about 60. As is readily understood by one of ordinary skill in the art, n represents an average value.

In a preferred embodiment, the poly(diorganosiloxane) blocks comprise repeating structural units of the formula (IV):

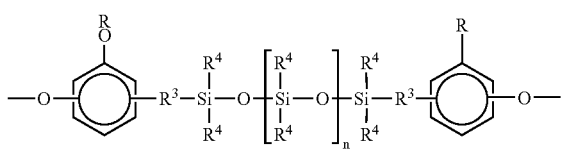

(IV)

where each occurrence of R may be the same or different and is selected from the group consisting of hydrogen, halogen, $C_{(1-8)}$ alkoxy, $C_{(1-8)}$ alkyl and $C_{(6-13)}$ aryl, $R^3$ is a $C_{(2-8)}$ divalent aliphatic radical preferably in the ortho or para position relative to the oxygen, each occurrence of $R^4$ may be the same of different and is selected from $C_{(1-13)}$ monovalent organic radicals, and n is an integer greater than or equal to 1, preferably greater than or equal to about 10, more preferably greater than or equal to about 25 and most preferably greater than or equal to about 40. It is desirable to have n be an integer less then or equal to about 1000, preferably less than or equal to about 100, more preferably less than or equal to about 75 and most preferably less than or equal to about 60. As is readily understood by one of ordinary skill in the art, n represents an average value.

Some of the radicals included within R in the above formula (IV) are halogen radicals, such as bromo, and chloro; alkyl radicals such as methyl, ethyl, and propyl; alkoxy radicals such as methoxy, ethoxy, and propoxy; aryl radicals such as phenyl, chlorophenyl, and tolyl. Radicals included within $R^3$ are, for example, dimethylene, trimethylene and tetramethylene. Radicals included within $R^4$ are, for example, $C_{(1-8)}$ alkyl radicals, haloalkyl radicals such as trifluoropropyl and cyanoalkyl radicals; aryl radicals such as phenyl, chlorophenyl and tolyl. $R^4$ is preferably methyl, or a mixture of methyl and trifluoropropyl, or a mixture of methyl and phenyl. In making the compositions of the invention one way is to blend at least two i.e. a first and a second polycarbonate/poly(diorganosiloxane) copolymer.

The first polycarbonate/poly(diorganosiloxane) copolymer has a light transmission less than or equal to about 55%. Within this range it is preferable for the first copolymer to have a light transmission less than or equal to about 50%, more preferably less than less than or equal to about 45%. The first copolymer has a haze greater than or equal to about 45, preferably a haze greater than or equal to about 75 and most preferably a haze greater than or equal to about 90.

The second polycarbonate/poly(diorganosiloxane) copolymer has a light transmission greater than or equal to about 55%, preferably greater than or equal to about 60% and more preferably greater than or equal to about 70%. The second copolymer has a haze less than or equal to about 45, preferably less than or equal to about 25, and most preferably less than or equal to about 10. The first and second copolymers may have the same light transmission value or the same haze value but may not have the same light transmission and the same haze values. Without being bound by theory, it is believed that on a molecular scale the transparency of the polycarbonate/poly(diorganosiloxane) copolymer is related to the size, the distribution or a combination of the size and distribution of the poly(diorganosiloxane) blocks throughout the copolymer.

The polycarbonate/poly(diorganosiloxane) copolymers have a weight-average molecular weight (Mw, measured, for example, by ultra-centrifugation or light scattering) of greater than or equal to about 10,000, preferably greater than or equal to about 20,000. The weight average molecular weight is generally less than or equal to about 200,000, preferably less than or equal to about 100,000. It is generally desirable to have the polydiorganosiloxane units contribute about 0.5 to about 80 wt % of the total weight of the polycarbonate/poly(diorganosiloxane) copolymer.

In making the thermoplastic compositions typically about 1 to about 99 weight percent of the first copolymer are admixed with about 99 to about 1 of the second copolymer, based on the total weight of the composition.

Polycarbonate/poly(diorganosiloxane) copolymers can be made by a variety of methods such as interfacial polymerization, melt polymerization and solid state polymerization. Preferably the polycarbonate/poly(diorganosiloxane) copolymers are made by introducing phosgene under interfacial reaction conditions into a mixture of a dihydric phenol, such as BPA, and a hydroxyaryl-terminated poly (diorganosiloxane). The polymerization of the reactants can be facilitated by use of a tertiary amine catalyst or a phase transfer catalyst.

The hydroxyaryl-terminated poly(diorganosiloxane) can be made by effecting a platinum catalyzed addition between a siloxane hydride of the formula (V),

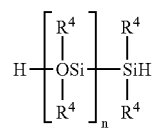

(V)

and an aliphatically unsaturated monohydric phenol wherein $R^4$ and n are as previously defined.

Some of the aliphatically unsaturated monohydric phenols, which can be used to make the hydroxyaryl-terminated poly(diorganosiloxane)s are, for example, 4-allyl-2 methoxy phenol (eugenol), 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol and 2-allyl-4,6-dimethylphenol.

Among the preferred phase transfer catalysts which can be utilized are catalysts of the formula $(R^5)_4Q^+X$, where $R^5$ is a member selected from the same or different, $C_{(1-10)}$alkyl groups, Q is a nitrogen or phosphorus atom, and X is a member selected from a halogen atom, or an $—OR^6$ group, and $R^6$ is a member selected from hydrogen, a $C_{(1-8)}$alkyl group and a $C_{(6-8)}$ aryl group. Some of the phase transfer catalysts which can be used are $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, $CH_3[CH_3(CH_2)_2]_3NX$ where X is selected from $Cl^-$, $Br^-$ or $—OR^6$. An effective amount of a phase transfer catalyst is greater than or equal to about 0.1, preferably greater than or equal to about 0.5 wt % based on the weight of bisphenol in the phosgenation mixture. It is generally desirable to have the phase transfer catalyst less than or equal to about 10 wt %, preferably less than or equal to about 2 wt % based on the weight of bisphenol in the phosgenation mixture.

Several of the bisphenols which can be phosgenated are for example, resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1- naphthylmethane, 1,1-bis(4-hydroxyphenyl)methane, 1,1-bis(4-hydroxyphenyl)ethane, 1,2-bis(4-hydroxyphenyl)ethane, 1,1-bis(4-hydroxyphenyl)-1-phenylethane, 2,2-bis(4-hydroxyphenyl)propane, 2-(4-hydroxyphenyl)-2-)3-hydroxyphenyl)propane and 2,2-bis(4-hydroxyphenyl) butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis(4-hydroxy-1-methylphenyl)propane, 1,1-bis(4-hydroxy-tert-butylphenyl)propane, 2,2-bis(4-hydroxy-3-bromophenyl) propane, and 1,1-bis(hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantene, (.alpha.,.alpha.'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl) phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole.

The first polycarbonate/poly(diorganosiloxane) copolymer can be produced by blending BPA with an organic solvent and an effective amount of phase transfer catalyst or an aliphatic tertiary amine, such as triethylamine, under interfacial conditions. Sufficient alkali metal hydroxide can be utilized to raise the pH of the bisphenol reaction mixture prior to phosgenation, to a value of about 10.5. This can result in the dissolution of some of the bisphenol into the aqueous phase. Suitable organic solvents, which can be used, are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Aqueous alkali, or alkaline earth metal hydroxide addition can be used to maintain the pH of the phosgenation mixture near the pH set point, which may be in the range of between about 10 to about 12. Some of the alkali metal or alkaline earth metal hydroxides, which can be employed, are for example, sodium hydroxide, potassium hydroxide, and calcium hydroxide. Sodium and potassium hydroxides, and particularly sodium hydroxide are preferred.

During the course of phosgene introduction at a pH of from about 10 to about 12, and depending upon the rate of phosgene addition, the pH can be lowered to allow for the introduction of the hydroxyaryl-terminated poly(diorganosiloxane). End-capping agents such as phenol, p-butylphenol, p-cumyl phenol, octylphenol, nonylphenol and other mono-hydroxyaromatic compounds may be used to regulate the molecular weight or to terminate the reaction.

The second polycarbonate/poly(diorganosiloxane) copolymer can be produced by phosgenating an aromatic dihydroxy compound in the presence of a phase transfer catalyst at a pH of about 5 to about 8 to form bischloroformate oligomers. To this is added a hydroxyaryl terminated poly(diorganosiloxane) which is allowed to react at a pH of about 9 to about 12 for a period of time sufficient to effect the reaction between the bischloroformate oligomers and the hydroxyalryl-terminated poly(diorganosiloxane), typically a time period of about 10 to about 45 minutes. Preferably there is a large molar excess of chloroformate groups relative to hydroxyaryl groups. The remaining aromatic dihydroxy compound is then added, and the disappearance of chloroformates is monitored, usually by phosgene paper. When substantially all chloroformates have reacted, an end-capping agent and optionally a a trialkylamine are added and the reaction phosgenated to completion at a pH of 9–12.

The polycarbonate/poly(diorganosiloxane) copolymer can be made in a wide variety of batch, semi-batch or continuous reactors. Such reactors are, for example, stirred tank, agitated column, tube and recirculating loop reactors. Recovery of the polycarbonate/poly(diorganosiloxane) copolymer can be achieved by any means known in the art such as through the use of an anti-solvent, steam precipitation or a combination of anti-solvent and steam precipitation.

The composition may comprise further components and additives. Suitable examples are other polymers like polycarbonates, styrene acrylonitrile polymers and polyesters, in particular cyclo aliphatic polyesters, flame retardants, anti-drip agents, impact modifiers such as graft polymers like ABS, visual effect additives, reinforcing agents and other additives.

The thermoplastic composition may further comprise a polycarbonate resin. Polycarbonate resins comprise repeating structural units of the formula (I):

in which at least about 60 percent of the total number of $R^1$ groups are aromatic organic radicals and the balance thereof are aliphatic, alicyclic, or aromatic radicals. Preferably, $R^1$ is an aromatic organic radical and, more preferably, a radical of the formula (II):

wherein each of $A^1$ and $A^2$ is a monocyclic divalent aryl radical and $Y^1$ is a bridging radical having one or two atoms which separate $A^1$ from $A^2$. In an exemplary embodiment, one atom separates $A^1$ from $A^2$. Illustrative non-limiting examples of radicals of this type are —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene or isopropylidene.

Polycarbonates can be produced by the interfacial reaction of dihydroxy compounds in which only one atom separates $A^1$ and $A^2$. As used herein, the term "dihydroxy compound" includes, for example, bisphenol compounds having general formula (VI) as follows:

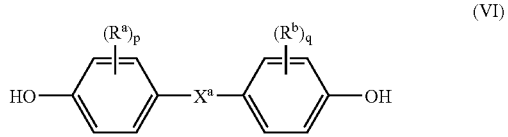

(VI)

wherein $R^a$ and $R^b$ each represent a halogen atom or a monovalent hydrocarbon group and may be the same or different; p and q are each independently integers from 0 to 4; and $X^a$ represents one of the groups of formula (VII):

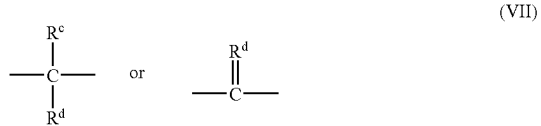

(VII)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds includes the following: resorcinol, 4-bromoresorcinol, hydroquinone, 4,4'-dihydroxybiphenyl, 1,6dihydroxynaphthalene, 2,6-dihydroxynaphthalene, bis(4-hydroxyphenyl) methane, bis(4-hydroxyphenyl)diphenylmethane, bis(4-hydroxyphenyl)-1-naphthylmethane, 1,1-bis(4-hydroxyphenyl)methane, 1,1-bis(4-hydroxyphenyl)ethane, 1,2-bis(4-hydroxyphenyl)ethane, 1,1-bis(4-hydroxyphenyl)-1-phenylethane, 2,2-bis(4-hydroxyphenyl)propane, 2-(4-hydroxyphenyl)-2-)3-hydroxyphenyl)propane and 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl)phenylmethane, 2,2-bis (4-hydroxy-1-methylphenyl)propane, 1,1-bis(4-hydroxy-tert-butylphenyl)propane, 2,2-bis(4-hydroxy-3-bromophenyl)propane, and 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantane, (.alpha.,.alpha.'-bis (4-hydroxyphenyl)toluene. bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane 2,2-bis(3-cyclohexyl-4-hydroxyphenyl)propane, 2,2-bis(3-allyl-4-hydroxyphenyl) propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9-bis(4-hydroxyphenyl) fluorine, 2,7-dihydroxypyrene, 6,6'-dihydroxy-3,3,3',3'-tetramethylspiro(bis)indane("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole.

It is also possible to employ two or more different dihydric phenols or a copolymer of a dihydric phenol with a glycol or with a hydroxy- or acid-terminated polyester or with a dibasic acid or hydroxy acid in the event a carbonate copolymer rather than a homopolymer is desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid and benzophenone tetracarboxylic acid. The branching agents may be added at a level of about 0.05–2.0 weight percent. Branching agents and procedures for making branched polycarbonates are described in U.S. Pat. Nos. 3,635,895 and 4,001,184 which are incorporated by reference. All types of polycarbonate end groups are contemplated as being useful in the polycarbonate composition.

Preferred polycarbonates are based on bisphenol A a compound with formaula II, in which each of $A^1$ and $A^2$ is p-phenylene and $Y^1$ is isopropylidene. Preferably, the average molecular weight of the polycarbonate is in the ranges from about 5,000 to about 100,000, more preferably in the range from about 10,000 to about 65,000, and most preferably in the range from about 15,000 to about 35,000. When present, the polycarbonate resin is employed in amounts of about 1 to about 99 weight percent, based on the total weight of the composition. Preferably the polycarbonate resin is present in an amount of about 1 to about 95, more preferably about 5 to about 90 and most preferably about 5 to about 85, based on the total weight of the composition.

The optional flame retardant may comprise a halogen based flame retardant, a sulfonate salt flame retardant or a phosphate based flame retardant. When the composition comprises flammable components such as alkylaromatic copolymers it is preferable for the flame retardant to comprise an organic phosphate flame retardant. The organic phosphate flame retardant is preferably an aromatic phosphate compound of the formula (VIII):

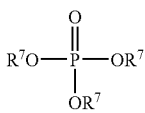

where $R^7$ is the same or different and is alkyl, cycloalkyl, aryl, alkyl substituted aryl, halogen substituted aryl, aryl substituted alkyl, halogen, or a combination of any of the foregoing, provided at least one $R^7$ is aryl.

Examples include phenyl bisdodecyl phosphate, phenyl-bisneopentyl phosphate, phenyl-bis(3,5,5'-tri-methyl-hexyl phosphate), ethyldiphenyl phosphate, 2-ethyl-hexyldi(p-tolyl)phosphate, bis-(2-ethylhexyl) p-tolylphosphate, tritolyl phosphate, bis-(2-ethylhexyl)phenyl phosphate, tri-(non-ylphenyl)phosphate, di-(dodecyl) p-tolyl phosphate, tricresyl phosphate, triphenyl phosphate, dibutylphenyl phosphate, 2-chloroethyldiphenyl phosphate, p-tolyl bis(2,5,5'-trimethylhexyl) phosphate, 2-ethylhexyldiphenyl phosphate, and the like. The preferred phosphates are those in which each R is aryl. Especially preferred is triphenyl phosphate, which may be either unsubstituted or substituted, for example, isopropylated triphenyl phosphate.

Alternatively, the organic phosphate can be a di- or polyfunctional compound or polymer having the formula IX, X or XI

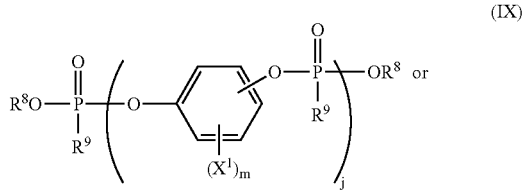

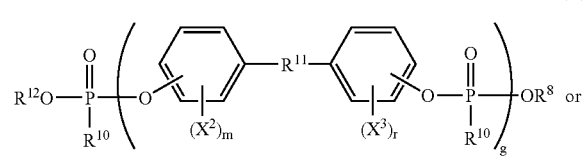

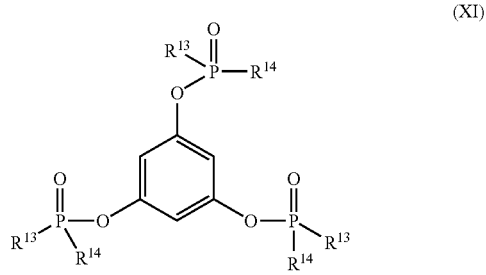

including mixtures thereof, in which $R^8$, $R^{11}$ and $R^{12}$ are, independently, hydrocarbon comprising 1 to about 30 carbons; $R^9$, $R^{10}$, $R^{13}$ and $R^{14}$ are, independently, hydrocarbon or hydrocarbonoxy comprising 1 to about 30 carbons; $X^1$, $X^2$ and $X^3$ are halogen; m and r are 0 or integers from 1 to 4, and j and g are from 1 to 30.

Examples include the bis diphenyl phosphates of resorcinol, hydroquinone and bisphenol-A, respectively, their oligomeric and polymeric counterparts and combination of the foregoing.

Methods for the preparation of the aforementioned di- and polyfunctional aromatic phosphates are described in British Patent No. 2,043,083.

Another development is the use of certain cyclic phosphates, for example, diphenyl pentaerythritol diphosphate, as is described by Axelrod in U.S. Pat. No. 4,254,775.

Also suitable as flame-retardant additives for this invention are compounds containing phosphorus-nitrogen bonds, such as phosphonitrilic chloride, phosphorus ester amides, phosphoric acid amides, phosphonic acid amides, phosphinic acid amides, tris(aziridinyl)phosphine oxide, or tetrakis(hydroxymethyl) phosphonium chloride. These flame-retardant additives are commercially available.

Preferred phosphate flame retardants include those based upon resorcinol such as, for example, resorcinol tetraphenyl diphosphate, as well as those based upon bis-phenols such as, for example, bis-phenol A tetraphenyl diphosphate. Phosphates containing substituted phenyl groups are also preferred.

In the final composition, the flame retardant is present in at least the minimum amount necessary to impart a desired degree of flame retardancy to the composition. Flame retardancy may be measured in a variety of ways such as UL94, IEC60695-11-20, IEC 60695-11-10, NF F16-101, NF P92-501, BS476, BS6853, DIN4102, and DIN5510. In one embodiment, the flame retardant is present in the minimum amount necessary to pass the UL-94 protocol at a rating of V-0, V-1, V-2, 5VB, or 5VA depending on the specific application requirements.

In general, the particular amount of flame retardant will vary, depending on the molecular weight of the organic phosphate, the amount of the flammable resin present and possibly other normally flammable ingredients which might also be included in the composition. Determination of the amount of flame retardant without undue experimentation is well within the ability of one of ordinary skill in the art. The organic phosphate flame retardants are generally present in the blends in amounts in the range from about 2 to about 35 weight percent, preferably from about 5 to about 30 weight percent, and most preferably from about 5 to about 15 weight percent, based on the total weight of the composition.

The composition also optionally includes an anti-drip agent such as a fluoropolymer. The fluoropolymer may be a fibril forming or non-fibril forming fluoropolymer. Preferably the fluoropolymer is a fibril forming polymer. In some embodiments polytetrafluoroethylene is the preferred fluoropolymer. In some embodiments it is preferred to employ an encapsulated fluoropolymer i.e. a fluoropolymer encapsulated in a polymer as the anti-drip agent. An encapsulated fluoropolymer can be made by polymerizing the polymer in the presence of the fluoropolymer. Alternatively, the fluoropolymer can be pre-blended in some manner with a second polymer, such as for, example, an aromatic polycarbonate resin or a styrene-acrylonitrile resin as in, for example, U.S. Pat. Nos. 5,521,230 and 4,579,906 to form an agglomerated material for use as an anti-drip agent. Either method can be used to produce an encapsulated fluoropolymer.

The fluoropolymer in the encapsulated fluoropolymer comprises a fluoropolymer with a melting point of greater than or equal to about 320° C., such as polytetrafluoroethylene. A preferred encapsulated fluoropolymer is a styrene-acrylonitrile copolymer encapsulated polytetrafluoroethylene (i.e., TSAN). TSAN can be made by copolymerizing styrene and acrylonitrile in the presence of an aqueous dispersion of polytetrafluoroethylene (PTFE). TSAN can, for example, comprise about 50 wt % PTFE and about 50 wt % styrene-acrylonitrile copolymer, based on the total weight of the encapsulated fluoropolymer. The styrene-acrylonitrile copolymer can, for example, be about 75 wt % styrene and about 25 wt % acrylonitrile based on the total weight of the copolymer. TSAN offers significant advantages over polytetrafluoroethylene, namely TSAN is more readily dispersed in the composition.

The anti-drip agent, when present, comprises greater than or equal to about 0.5 weight percent, preferably greater than or equal to about 0.1 weight percent, based on the total weight of the composition. The anti-drip agent, when present, comprises less than or equal to about 5 weight percent, preferably less than or equal to about 2.5 weight percent, and more preferably less than or equal to about 1 weight percent, based on the total weight of the composition.

The thermoplastic composition may optionally comprise an impact modifier. The impact modifier copolymer resin added to the thermoplastic composition in an amount between about 1 and 30% by weight may comprise one of several different rubbery modifiers such as graft or core shell rubbers or combinations of two or more of these modifiers. Suitable are the groups of modifiers known as acrylic rubbers, ASA rubbers, diene rubbers, organosiloxane rubbers, EPDM rubbers, styrene-butadiene-styrene (SBS) or styrene-ethylene-butadiene-styrene (SEBS) rubbers, ABS rubbers, MBS rubbers, styrene acrylonitrile copolymers and glycidyl ester impact modifiers.

The term acrylic rubber modifier can refer to multi-stage, core-shell, interpolymer modifiers having a cross-linked or partially crosslinked (meth)acrylate rubbery core phase, preferably butyl acrylate. Associated with this crosslinked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Preferred rubbers are graft or core shell structures with a rubbery component with a Tg below 0° C., preferably between about −40° to −80° C., composed of poly alkylacrylates or polyolefins grafted with polymethylmethacrylate (PMMA) or styrene acrylonitrile (SAN). Preferably the rubber content is at least 10 wt %, more preferably greater than 40 wt %, and most preferably between about 40 and 75 wt %.

Especially suitable rubbers are the butadiene core-shell polymers of the type available from Rohm & Haas, for example Paraloid® EXL2600. Most preferably, the impact modifier will comprise a two stage polymer having an butadiene based rubbery core and a second stage polymerized from methylmethacrylate alone or in combination with styrene. Other suitable rubbers are the ABS types Blendex® 336 and 415, available from GE Specialty Chemicals. Both rubbers are based on impact modifier resin of SBR rubber. Although several rubbers have been described, many more are commercially available. Any rubber may be used as an impact modifier as long as the impact modifier does not negatively impact the physical or aesthetic properties of the thermoplastic composition.

The thermoplastic composition may optionally comprise a cycloaliphatic polyester resin. The cycloaliphatic polyester resin comprises a polyester having repeating units of the formula XII:

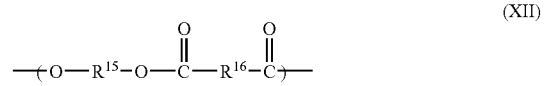

where at least one $R^{15}$ or $R^{16}$ is a cycloalkyl containing radical.

The polyester is a condensation product where $R^{15}$ is the residue of an aryl, alkane or cycloalkane containing diol having 6 to 20 carbon atoms or chemical equivalent thereof, and $R^{16}$ is the decarboxylated residue derived from an aryl, aliphatic or cycloalkane containing diacid of 6 to 20 carbon atoms or chemical equivalent thereof with the proviso that at least one $R^{15}$ or $R^{16}$ is cycloaliphatic. Preferred polyesters of the invention will have both $R^{15}$ and $R^{16}$ cycloaliphatic.

Cycloaliphatic polyesters are condensation products of aliphatic diacids, or chemical equivalents and aliphatic diols, or chemical equivalents. Cycloaliphatic polyesters may be formed from mixtures of aliphatic diacids and aliphatic diols but must contain at least 50 mole % of cyclic diacid and/or cyclic diol components, the remainder, if any, being linear aliphatic diacids and/or diols.

The polyester resins are typically obtained through the condensation or ester interchange polymerization of the diol or diol equivalent component with the diacid or diacid chemical equivalent component.

$R^{15}$ and $R^{16}$ are preferably cycloalkyl radicals independently selected from the following formulas XIIIA to XIIIK:

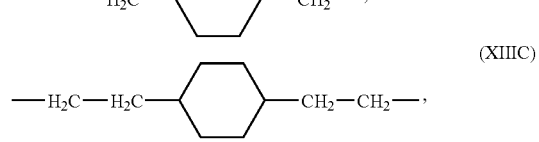

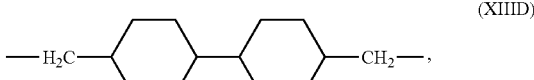

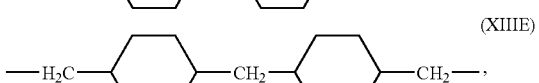

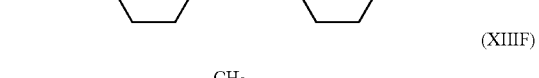

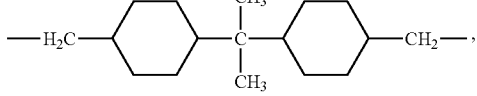

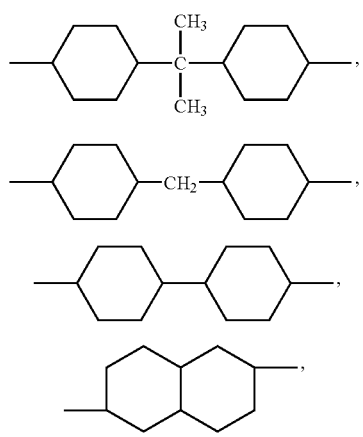

The preferred cycloaliphatic radical R$^{16}$ is derived from the 1,4-cyclohexyl diacids and most preferably greater than 70 mole % thereof in the form of the trans isomer. The preferred cycloaliphatic radical R$^{15}$ is derived from the 1,4-cyclohexyl primary diols such as 1,4-cyclohexyl dimethanol, most preferably more than 70 mole % thereof in the form of the trans isomer.

Other diols useful in the preparation of the polyester resins of the present invention are straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; 2,2,4,4-tetramethyl-1,3-cyclobutanediol (TMCBD), triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent. Linear dicarboxylic acids like adipic acid, azelaic acid, dicarboxyl dodecanoic acid and succinic acid may also be useful.

Cyclohexane dicarboxylic acids and their chemical equivalents can be prepared, for example, by the hydrogenation of cycloaromatic diacids and corresponding derivatives such as isophthalic acid, terephthalic acid or naphthalenic acid in a suitable solvent such as water or acetic acid using a suitable catalysts such as rhodium supported on a carrier such as carbon or alumina. They may also be prepared by the use of an inert liquid medium in which a phthalic acid is at least partially soluble under reaction conditions and with a catalyst of palladium or ruthenium on carbon or silica.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and may be preferred. Mixtures of the cis- and trans-isomers are useful herein as well.

When the mixture of isomers or more than one diacid or diol is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most favored chemical equivalent comprises the dimethyl ester of the acid, particularly dimethyl-1,4-cyclohexane-dicarboxylate.

A preferred cycloaliphatic polyester is poly(cyclohexane-1,4-dimethylene cyclohexane-1,4-dicarboxylate) also referred to as poly(1,4-cyclohexane-dimethanol-1,4-dicarboxylate) (PCCD) which has recurring units of formula XIV:

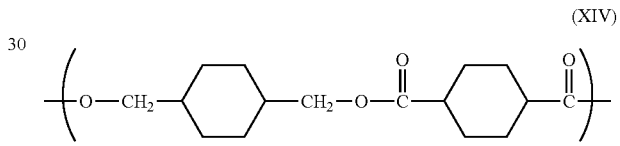

With reference to the previously set forth general formula, for PCCD, R$^{15}$ is derived from 1,4 cyclohexane dimethanol; and R$^{16}$ is a cyclohexane ring derived from cyclohexanedicarboxylate or a chemical equivalent thereof. The favored PCCD has a cis/trans formula.

The polyester polymerization reaction is generally run in the melt in the presence of a suitable catalyst such as a tetrakis (2-ethyl hexyl) titanate, in a suitable amount, typically about 50 to 200 ppm of titanium based upon the final product.

The preferred aliphatic polyesters have a glass transition temperature (Tg) which is above 50° C., more preferably above 80° C. and most preferably above about 100° C.

Also contemplated herein are the above polyesters with about 1 to about 50 percent by weight, of units derived from polymeric aliphatic acids and/or polymeric aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

When present the ratio of cycloaliphatic polyester to polycarbonate/poly(diorganosiloxane) copolymer is about 80:20 to 5:95% by weight of the entire mixture. Blends of 70:30 to 40:60 are preferred.

The thermoplastic composition may further comprise one or more visual effects additives, sometimes known as visual effects pigments. The visual effects additives may be present in an encapsulated form, a non-encapsulated form, or laminated to a particle comprising polymeric resin. Some non-limiting examples of visual effects additives are aluminum, gold, silver, copper, nickel, titanium, stainless steel, nickel sulfide, cobalt sulfide, manganese sulfide, metal oxides, white mica, black mica, pearl mica, synthetic mica, mica coated with titanium dioxide, metal-coated glass flakes, and colorants, including but not limited, to Perylene Red. The visual effect additive may have a high or low aspect ratio and may comprise greater than 1 facet. Dyes may be employed such as Solvent Blue 35, Solvent Blue 36, Disperse Violet 26, Solvent Green 3, Anaplast Orange LFP, Perylene Red, and Morplas Red 36. Fluorescent dyes may also be employed including, but not limited to, Permanent Pink R (Color Index Pigment Red 181, from Clariant Corporation), Hostasol Red 5B (Color Index #73300, CAS # 522-75-8, from Clariant Corporation) and Macrolex Fluorescent Yellow 10GN (Color Index Solvent Yellow 160:1, from Bayer Corporation). It is also contemplated that pigments such as titanium dioxide, zinc sulfide, carbon black, cobalt chromate, cobalt titanate, cadmium sulfides, iron oxide, sodium aluminum sulfosilicate, sodium sulfosilicate, chrome antimony titanium rutile, nickel antimony titanium rutile, and zinc oxide may be employed. Visual effect additives in encapsulated form usually comprise a visual effect material such as a high aspect ratio material like aluminum flakes encapsulated by a polymer. The encapsulated visual effect additive has the shape of a bead.

The polymer material (i.e., the encapsulating material) surrounding the high aspect ratio particles may comprise any material that has a sufficient amount of transparency and/or translucency to allow the desired optical effect in a plastic product to be achieved. Some non-limiting examples of such materials comprise a thermoset resin, a polymer prepared by suspension polymerization, or a polymer that is a thermoplastic. Such thermoset resins may comprise, for example, epoxy, phenolic, acrylics, alkyds, polyester, polyimide, polyurethane, silicone, bis-maleimide, cyanate ester, vinyl, and/or benzocyclobutene resins. The thermoset resin composition may also comprise various catalysts, flame retardants, curing agents, fillers, reinforcing agents, and other components, if so desired. The various thermoset resin components may be used alone, in combination with one another, or in combination with another thermoplastic resin(s).

At least one cross-linking agent may be included in the polymer material (i.e., the encapsulating material) surrounding the high aspect ratio particles, and the inclusion of a cross-linking agent is of particular importance when a suspension polymerization process is employed for the encapsulation. In some embodiments the inclusion of a cross-linking agent may impart mechanical strength and/or melt stability to the pigment beads when they are processed in a composition to make a final extruded or molded product. An illustrative cross-linking agent is divinylbenzene. The amount of cross-linking agent employed may affect the physical properties of the final product.

The encapsulation of the high aspect ratio material, and an optional further cross-linking of the polymer encapsulation material, may be accomplished in a number of different manners, such as, for example, spray drying techniques, the Wurster process, or in-situ suspension polymerization. When suspension polymerization is utilized, the method may comprise the steps of: dispersing high aspect ratio particles in at least one of a monomer or a polymer and a crosslinking agent to form a suspension mixture; adding the suspension mixture to an aqueous mixture comprising a suspension agent; heating and mixing the aqueous reaction mixture to encourage the formation of beads, wherein most beads encapsulate one or more high aspect ratio particles; quenching the aqueous reaction mixture after the beads are formed; and collecting the beads. This method may further comprise suspending the one or more high aspect ratio particles in the suspension mixture by sonicating the suspension mixture prior to adding the suspension mixture to the aqueous mixture. It may also comprise utilizing gravity sedimentation or centrifugation to separate the beads into various batches, and drying the beads thereafter.

In the case of suspension polymerization, the use of a crosslinking agent such as divinylbenzene provides superior stability in the product, as this prevents melting and dispersion of the particle and encapsulated pigment during compounding in the resin of choice. In addition, for most efficient pigment encapsulation, it is desirable that the pigment partitions between the suspension mixture (suspended phase) and the aqueous phase in such a manner that the pigment resides substantially in the suspended phase over the course of polymerization. Surface modification of the pigment particles, for example to increase hydrophobicity, can be used to enhance the partition ratio for a given pigment.

In one embodiment, aluminum flakes having diameters of less than about 100 micrometers are encapsulated in a polymer. This encapsulation may be achieved via suspension polymerization of monomers in the presence of the aluminum flakes. A cross-linking agent may be included to impart mechanical strength and melt stability to the encapsulated beads when they are processed into the final extruded or molded product. The flakes may also incorporate surface functionalization thereon, so that growth of the encapsulant polymer is a surface-promoted process. In the case of suspension polymerization, surface functionalization may also be necessary for flakes that have a hydrophilic surface.

The composition may further comprise one or more reinforcing agents, including low-aspect ratio fillers, fibrous fillers, and polymeric fillers. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993. Non-limiting examples of fillers include silica powder, such as fused silica, crystalline silica, natural silica sand, and various silane coated silicas; talc, including fibrous, modular, needle shaped, and lamellar talcs; glass spheres, both hollow and solid, and surface-treated glass spheres; kaolin, including hard, soft, and calcined kaolin; mica, including metallized mica and mica surface treated with aminosilanes or acryloylsilanes coatings to impart good physicals to compounded blends; feldspar and nepheline syenite; silicate spheres; cenospheres; fillite; aluminosilicate (atmospheres), including silanized and metallized aluminosilicate; quartz; quartzite; perlite; Tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; graphite, such as graphite powder; flaked fillers and reinforcements such as glass flakes, flaked silicon carbide, aluminum diboride, aluminum flakes, and steel flakes; processed mineral fibers such as those derived from blends comprising at least one of aluminum silicates, aluminum oxides, magnesium oxides, and calcium sulfate hemihydrate; natural fibers including wood flour, cellulose, cotton, sisal, jute, starch, cork flour, lignin, ground nut shells, corn, rice grain husks; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, fibers from mixed oxides of aluminum, boron and silicon; single crystal fibers or "whiskers" including silicon carbide fibers, alumina fibers, boron carbide fibers, iron fibers, nickel fibers, copper fibers; glass fibers, including textile glass fibers such as E, A, C, ECR, R, S, D, and NE glasses, and quartz; vapor-grown carbon fibers include those having an average diameter of about 3.5 to about 500 nanometers as described in, for example, U.S. Pat. Nos. 4,565,684 and 5,024,818 to Tibbetts et al., U.S. Pat. No. 4,572,813 to Arakawa; U.S. Pat. Nos. 4,663,230 and 5,165,909 to Tennent, U.S. Pat. No. 4,816,289 to Komatsu et al., U.S. Pat. No. 4,876,078 to Arakawa et al., U.S. Pat. No. 5,589,152 to Tennent et al., and U.S. Pat. No. 5,591,382 to Nahass et al.; and the like. Some reinforcing agents may also function as visual effect additives and some visual effect additives may also function as reinforcing agents.

When present, the reinforcing agent may be used in an amount of about 2 to about 40 parts by weight; preferably about 2 to about 30 parts by weight, more preferably about 2 to about 20 parts by weight, yet more preferably about 5 to about 20 parts by weight, per 100 parts by weight total resin.

Various additives may be used alone or in combination. Additives may include such materials as whitening agents, thermal stabilizers, antioxidants, light stabilizers, plasticizers, colorants, extenders, antistatic agents, catalyst quenchers, mold releasing agents, additional resin, blowing agents, and processing aids. The different additives that can be incorporated in the compositions are commonly used and known to one skilled in the art.

The translucent thermoplastic composition may be made by combining and mixing the components of the composition under conditions suitable for the formation of a blend of the components, such as for example, by melt mixing using, for example, a two-roll mill, a Banbury mixer or a single screw or twin-screw extruder, and, optionally, then reducing the composition so formed to particulate form, e.g., by pelletizing or grinding the composition. In some instances it may be preferably to add some components as part of a masterbatch. In general it is desirable to add fibrous fillers and visual effects additives downstream.

In some embodiments, one or more components can be added to the composition as an aqueous mixture or solution followed by devolatilization in appropriate processing equipment such as in an extruder. In another embodiment, some of the components may be mixed in aqueous solution and then evaporated to form a material which can be added to the remaining components.

In a preferred embodiment, the translucent composition after molding or extruding exhibits a transmission measured on a 3.2 millimeter (mm) thick plaque according to ASTM D1003 of about 25% to about 85%, preferably about 35% to about 80%; and a haze measured on a 3.2 mm thick plaque according to ASTM D1003 less than about 104, preferably less than about 100, more preferably less than about 90. Typically the haze is greater than or equal to about 5 or even greater than or equal to 10.

The thermoplastic resin compositions can be molded into useful shaped articles by a variety of means such as injection molding, extrusion, rotational molding, blow molding and thermoforming to form articles such as, for example, computer and business machine housings, hand held electronic device housings, and components of lighting fixtures, ornaments, home appliances, roofs, greenhouses, sun rooms, swimming pool enclosures, and the like.

The compositions described above may be used in the fabrication of translucent sheets. Techniques for the extrusion of translucent sheets, including solid sheets, multi-wall sheets, and multi-wall sheets comprising hollow bodies, are known in the art and described in, for example, U.S. Pat. No. 3,476,627 to Squires, U.S. Pat. No. 3,565,985 to Schrenk et al., U.S. Pat. No. 3,668,288 to Takahashi, U.S. Pat. No. 3,918,865 to Nissel, U.S. Pat. No. 3,933,964 to Brooks, U.S. Pat. No. 4,477,521 to Lehmann et al., and U.S. Pat. No. 4,707,393 to Vetter. There is no particular limitation on the composition of additional layers used to form coextruded sheets. There is no particular limitation on the structure or geometry of the multi-wall sheets. The additional layers may comprise, for example, fluorescing agents to facilitate manufacturing and/or ultraviolet light absorbers to improve weatherability. The thickness of the multi-wall sheet is preferably about 4 mm to about 40 mm, while the thickness of the solid sheet is preferably about 1 mm to about 12 mm.

It is also contemplated that the thermoplastic composition could be utilized in multi-layer materials. One such example is as a cap layer on a substrate. Useful substrates would be those that that are compatible with the thermoplastic composition and would suffer little or no delamination under processing or normal use conditions. Multi-layer materials can be formed by a number of methods, including but not limited to co-extrusion, compression molding, and lamination.

A number of embodiments are contemplated. In one embodiment, a thermoplastic composition comprises a first polycarbonate/poly(diorganosiloxane) copolymer having a first light transmission and a first haze; a second polycarbonate/poly(diorganosiloxane) copolymer having a second light transmission and a second haze. The first light transmission and the second light transmission have an absolute difference of at least about 10%, preferably at least about 15% and more preferably at least about 25%. The first haze and the second haze may have an absolute difference of at least about 50, preferably at least about 65, and more preferably at least about 80.

The thermoplastic compositions are further illustrated by the following non-limiting examples.

EXAMPLE I

A series of compositions has been prepared using the polymeric materials in Table 1.

TABLE 1

| Component | Description |
| --- | --- |
| PC/PDMS-1 | A first polycarbonate/polydimethylsiloxane copolymer having about 20 weight percent siloxane based on the total weight of the copolymer, a absolute weight average molecular weight of about 30.000 g/mol, a light transmission of about <30% and a haze of about 104. |
| PC/PDMS-2 | A second polycarbonate/polydimethylsiloxane copolymer having about 6 weight percent siloxane based on the total weight of the copolymer, an absolute weight average molecular weight of about 23.500 g/mol, a light transmission of about >80% and a haze of about 2. |
| PC-1 | A bisphenol A polycarbonate made by an interfacial process with an absolute weight average molecular weight of about 21.800 g/mol, a light transmission of about 90% and a haze of about 1, obtained from GE Plastics. |

TABLE 1-continued

| Component | Description |
| --- | --- |
| SAN | A styrene acrylonitrile copolymer comprising about a 75:25 weight ratio of styrene to acrylonitrile and with an weight average molecular weight of about 90,000 g/mol (relative to polystyrene standards). |

Preparation of PC/PDMS 1

Step 1

Representative preparation of eugenol capped polydimethylsiloxane fluid: Octamethylcyclotetrasiloxane (8.3 kg, 28.0 moles), tetramethyldisiloxane (330 g, 2.46 moles) and Filtrol 20 (86 g, 1% by weight, Harshaw/Filtrol Clay Products) were combined in a 12 L flask and heated to 45 C for 2 hours. The temperature was raised to 100° C. and the mixture was rapidly agitated for 5 hours. The mixture was allowed to cool then filtered through a plug of Celite filtering aid. To the crude product was added a mixture of eugenol (774 g, 4.72 moles) and Karstedt's platinum catalyst (1.57 g, 10 ppm Pt) at a rate of 40 g/minute. Reaction completion was monitored by the disappearance of the siloxane hydrogen in the FTIR spectrum. The reaction product was stripped of volatiles using a falling thin film evaporator operating at 200° C. and 1.5 torr. The isolated material was a light brown oil with a viscosity of 100 cstokes at 25° C. and a degree of polymerization of about 49 siloxane units. The material was used without further purification.

Step 2

Representative preparation of the copolymer compositions: Bisphenol-A (90.7 kg, 398 moles), the D49 eugenol capped polydimethylsiloxane fluid (28.6 kg, 6.85 moles, 20 percent by weight siloxane), triethylamine (0.41 kg), p-cumylphenol (2.9 kg, 13.5 mole) and sodium gluconate (150 g) were combined with water (212 L) and dichloromethane (275 L) in the 1000 L reactor. The biphasic mixture was stirred vigorously and brought to pH 10 by the addition of 50% aqueous sodium hydroxide solution. Phosgene (52.2 kg, 527 moles) was added over the course of 30 minutes with the reaction pH maintained in the range of 10.0 to 10.5. After completion of the reaction additional dichloromethane (200 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The work up procedure was carried out such that the residual chloride and triethylamine in the resin was less than 5 ppm. The resin was isolated as white granules (121 kg) by steam precipitation from the dichloromethane solution.

The material was characterized by standard analytical methods. Gel Permeation Chromatography (polystyrene standard using a K factor to polycarbonate molecular weights) was used for the determination of molecular weight and 1H NMR for the determination of the siloxane content (PDMS content).

Preparation of PC/PDMS 2

PC/PDMS 2 was made by combining 15 liters of methylene chloride, 15 liters of deionized water, 1585 grams (6.94 mol) of bisphenol A and 100 milliliters of methyltributylammonium chloride in a stirred reactor. The mixture was phosgenated at a rate of about 40 to about 140 grams per minute until 1050 grams of phosgene was delivered as determined by a totalizer connected to a mass flowmeter. The pH was held between 6 and 7 by the continuous addition of a 50 weight percent aqueous solution of sodium hydroxide. Once the addition of phosgene was complete, the reactor was sparged with nitrogen to remove excess phosgene. A sample was then tested for phosgene using phosgene paper and tested for chloroformate. The chloroformate concentration was found to be 0.24 moles per liter. 550 grams (0.11 mole) of an eugenol capped siloxane made in a similar way as described above in step 1 was dissolved in 1 liter of methylene chloride and added to the reactor over a period of approximately 1 minute. The siloxane addition tube was rinsed with an addition liter of methylene chloride to ensure that all of the siloxane was transferred to the reactor. The pH was then raised to between 10.5 and 11.5 and the siloxane was allowed to react with the bischloroformate oligomers for a period of 10 minutes. At this point another sample was taken and checked for the presence of chloroformates. The reactor was then charged with 6350 grams (27 moles) of bisphenol A, 20 liters of methylene chloride and 20 liters of deionized water. The reaction mixture was allowed to stir until all of the residual chloroformates had disappeared. 283 grams (1.33 moles) of para-cumylphenol (PCP) and 75 milliliters of triethylamine were added to the reactor. The reaction mixture was then phosgenated (3225 grams of phosgene) to completion at a pH of 10.5 to 11.5. Once the desired amount of phosgene had been added a sample was taken and analyzed for chloroformates and phenolic groups. The reaction mixture was then transferred to a centrifuge feed tank and purified in a series of 7 centrifugations to separate the resin from the brine. The resin was then washed by two HCl washes and four deionized water washes. The resin solution was then steam precipitated and dried.

The compositions optionally further contain the following additives, given in Table 2.

TABLE 2

| Component | Description |
| --- | --- |
| BPADP | Bisphenol A bis(diphenylphosphate), or BPADP, commercially available from Albemarle under the tradename NcendX ™ P-30 |
| T-SAN | T-SAN, a drip retardant encapsulated poly(tetrafluorethylene), obtained from General Electric Plastics Europe, comprising 50 weight percent polystyrene acrylonitrile and 50 weight percent poly(tetrafluorethylene). |
| Metal Flake MB | A 30 wt % masterbatch of Aluminium flakes in bisphenol A polycarbonate. Aluminium flakes are supplied by Silberline under the tradename Silvex 793-20-C. |
| Metal Flake SAN bead | A 5 wt % composite of Al flakes (Silvex 793-20-C) in a SAN bead, produced in a suspension process, with 92:8 weight ratio of styrene to acrylonitrile and crosslinked with about 0.2 wt % divinylbenzene. |
| Luminova MB | A 30 wt % masterbatch of a afterglow phosphorescent pigment in bisphenol A polycarbonate. The pigment LumiNova$_R$ GLL-300FFS is supplied by United Mineral & Chemical Corporation. |
| Red Colorant | A solvent red 135, Perinone dyestuff supplied by Bayer AG under the tradename Macrolex$_R$ Red EG |

All compositions of example I further contain 0.1 wt % of a phosphite stabilizer, tris(2,4-di-tert-butylphenylphosphite), commercially available as IRGAFOS® 168 from Ciba Specialty Chemicals, and 0.1 wt % of a hindered phenol stabilizer, octadecyl-3-(3,5-di-tert-butyl-4-hydroxyphenyl)propionate, commercially available as IRGA-NOX® 1076 also from Ciba Specialty Chemicals.

All compositions were compounded on a Werner & Pfleiderer co-rotating twin screw extruder (25 millimeter screw) and subsequently were molded according to ISO294 on a ENGEL injection molding machine. Compositions with BPADP were compounded and molded at a temperature of 275° C. and 280° C., repectively. All others were compounded and molded at a temperature of 300° C. and 310° C., respectively.

The compositions were tested for the following properties:

1) Haze and transmission: according to ASTM D1003 using a Gardner Haze Guard Dual, on 3.2 millimeter thick molded plaques.
2) Average size of the siloxane domains is determined from micrographs using analySIS software (SIS). The software allows to manually select the domain borders. From each sample the longest size of about 25 domains was measured in duplo. Micrographs (magnification 135.000) were obtained by Transmission Electron Microscopy (FEI, Technai 12). Samples were cut from 3.2 mm thick molded plaques and subsequently microtomed at room temperature and studied without further staining or etching.
3) Metallic appearance was quantified by measuring the difference in lightness L*, according to DIN5033 part 3 CIE 1976 using a D65 illuminant, between light reflected at an angle of 15 and 110 degrees (deltaL*=L15°–L110°, on an multi angle spectrophotometer (Gretag Macbeth CE-740GL) on 3.2 mm thick plaques. All plaques were measured on the same location and with the same orientation.
4) Chroma, C* according to DIN5033 part 3 CIE 1976, was measured using a D65 illuminant, spectro settings specular included and 10 degree observer on a spectrophotometer (Gretag Macbeth color-eye 7000). A 3.2 mm plaque was measured in reflection with a white spectralon tile backing the sample. All plaques were measured on the same location and with the same orientation.
5) Luminescence intensity, reported in mCd/m2, was measured in a dark chamber using a Minolta LS-100 luminance meter with close-up lens #122 coupled to internally developed acquisition software running under Microsoft Excel. Samples were excited for 5 minutes with a D65 illuminant (1030 lux+/−20 lux measured with Minolta T-10 illuminance meter) immediately prior to the measurement. Luminescence intensities of the samples after 5 and 10 minutes in the dark chamber were reported.
6) Izod Notched Impact strength was tested according to ISO180-1A on 4 millimeter thick test bars and at various temperatures.
7) Melt Volume rate, MVR, was measured according to ISO 1133 at 300° C. using a weight of 2.16 kilograms.
8) The puncture energy was measured according to ISO 6603-2 using a hydraulic tensile machine (Zwick/Rel 1852). In this multi axial impact test. the energy (in Joules) was measured needed for a dart (20 mm diameter) to penetrate a 3.2 mm plaque at a speed of 4.4 m/s (support diameter is 40 mm).

In Table 3a, a comparative series of compositions comprising PC/PDMS-1 and PC-1 is given with an increasing PC-1 content and decreasing PC/PDMS-1 content. Results show that diluting of PC-PDMS-1 with PC-1 is very ineffective in increasing Transmission or reducing Haze and a substantial reduction in PC-PDMS content is needed to achieve a Transmission of for instance 60% (Comparative composition 6), resulting in a substantial reduction in low temperature Izod Notched Impact. Microscopic analyses reveals that dilution with PC-1 results merely in a reduction of the amount of PDMS domains but does not result in a consistent reduction of PDMS domain size.

TABLE 3a

PC/PDMS-1 diluted with PC-1

| Composition# | 1* | 2* | 3* | 4* | 5* | 6* | 7* |
|---|---|---|---|---|---|---|---|
| PC/PDMS -1 [wt %] | 30 | 24 | 18 | 12 | 6 | 3 | 0 |
| PC-1 [wt %] | 70 | 76 | 82 | 88 | 94 | 97 | 100 |
| Additives | 0.2 | 0.2 | 0.2 | 0.2 | 0.2 | 0.2 | 0.2 |
| Siloxane [wt %] | 6 | 4.8 | 3.6 | 2.4 | 1.2 | 0.6 | 0 |
| Transmission [%] | 28 | 32 | 35 | 40 | 46 | 60 | 91 |
| Haze | 103 | 102 | 99 | 90 | 71 | 32 | 1 |
| Average PDMS Domain size [nm] | 48 | 45 | 47 | 54 | 50 | 96 | — |
| Izod Notched Impact @ −30° C. [kJ/m2] | 47 | 47 | 42 | 20 | 14 | 11 | 10 |
| MVR 300° C. @ 2.16 kg [cm3/10 min] | 23.9 | 21.1 | 31.8 | 37.4 | 42.3 | 45.4 | 48.0 |

*Comparative example

In Table 3b a series of compositions is given with the same PC/PDMS-1 content as in the compositions of Table 3a, but diluted with PC/PDMS-2. Surprisingly, replacing PC-1 with PC/PDMS-2 results in a significant increase in Transmission and reduction in Haze, while retaining good low temperature impact properties. Microscopic analyses reveal that the addition of PC/PDMS-2 results in an unexpected significant reduction of average siloxane (PDMS) domain size.

TABLE 3b

PC/PDMS-1 diluted with PC/PDMS-2

| Composition# | 8 | 9 | 10 | 11 | 12 | 13 | 14* |
|---|---|---|---|---|---|---|---|
| PC/PDMS -1 [wt %] | 30 | 24 | 18 | 12 | 6 | 3 | 0 |
| PC-1 [wt %] | | | | | | | |
| PC/PDMS -2 [wt %] | 70 | 76 | 82 | 88 | 94 | 97 | 100 |
| Additives | 0.2 | 0.2 | 0.2 | 0.2 | 0.2 | 0.2 | 0.2 |
| Siloxane [wt %] | 10.2 | 9.4 | 8.5 | 7.7 | 6.8 | 6.4 | 6.0 |
| Transmission [%] | 35 | 40 | 45 | 56 | 74 | 81 | 85 |
| Haze | 99 | 91 | 76 | 42 | 10 | 5 | 3 |
| Average PDMS Domain size [nm] | 39 | 40 | 38 | 25 | 25 | 22 | 18 |
| Izod Notched Impact @ −30° C. [kJ/m2] | 45 | 45 | 47 | 45 | 42 | 38 | 30 |
| MVR 300° C. @ 2.16 kg [cm3/10 min] | 11.6 | 12.7 | 14.3 | 15.9 | 17.6 | 18.3 | 27.6 |

*Comparative example

In Table 3c, a series of compositions is given again with the same PC/PDMS-1 contents as the series of compositions in Tables 3a and 3c but diluted with PC/PDMS-2 and PC175, keeping the total siloxane content constant at 6 weight %. Again the remarkable effect of mixing with PC/PDMS-2 on final blend average siloxane domain size is demonstrated allowing to vary Haze and Transmission, between 3 to 103 and 28 to 85%, respectively, at constant overall siloxane content, while maintaining good low temperature impact properties.

TABLE 3c

PC/PDMS-1 diluted with PC/PDMS-2 and PC-1 at constant siloxane content of 6 weight %.

| Composition # | 1* | 15 | 16 | 17 | 18 | 14* |
|---|---|---|---|---|---|---|
| PC/PDMS-1 [wt %] | 30 | 24 | 18 | 12 | 6 | |
| PC-1 [wt %] | 70 | 56 | 42 | 28 | 14 | |
| PC/PDMS-2 [wt %] | | 20 | 40 | 60 | 80 | 100 |
| Additives | 0.2 | 0.2 | 0.2 | 0.2 | 0.2 | 0.2 |
| Siloxane [wt %] | 6.0 | 6.0 | 6.0 | 6.0 | 6.0 | 6.0 |
| Transmission [%] | 28 | 33 | 40 | 51 | 73 | 85 |
| Haze | 103 | 101 | 90 | 56 | 11 | 3 |
| Average PDMS Domain size [nm] | 48 | 42 | 37 | 28 | 24 | 18 |
| Izod Notched Impact @ −30° C. [kJ/m2] | 47 | 47 | 48 | 47 | 44 | 30 |
| MVR 300° C. @ 2.16 kg [cm3/10 min] | 23.9 | 23.8 | 23.9 | 21.5 | 20.4 | 27.6 |

*Comparative example

The benefit of controlling Haze and Transmission is demonstrated in Tables 4a, 4b and 4c, giving the very same series of compositions as shown in Table 3c, but including additionally either 2 weight % metal flake master batch (Table 4a), or 3 weight % Luminova master batch (Table 4b) or 0.2 weight % of a red colorant (table 4c), per 100 parts per weight of the compositions in Table 3c.

TABLE 4a

Same series of compositions as shown in Table 3c but including additionally metal flake masterbatch

| Composition # | 19* | 20 | 21 | 22 | 23 | 24* |
|---|---|---|---|---|---|---|
| PC/PDMS-1 [wt %] | 30 | 24 | 18 | 12 | 6 | |
| PG-1 [wt %] | 70 | 56 | 42 | 28 | 14 | |
| PC/PDMS-2 [wt %] | | 20 | 40 | 60 | 80 | 100 |
| Additives | 0.2 | 0.2 | 0.2 | 0.2 | 0.2 | 0.2 |
| Metal Flake MB [wt %] | 2 | 2 | 2 | 2 | 2 | 2 |
| Izod Notched Impact @ 23° C. [kJ/m2] | 33 | 33 | 33 | 29 | 27 | 22 |
| Izod Notched Impact @ −30° C. [kJ/m2] | 18 | 18 | 17 | 15 | 13 | 12 |
| MVR 300 C/2.16 kg | 24.5 | 23.9 | 23.0 | 22.9 | 21.8 | 20.9 |
| degree of metallic [delta L*] | 26.4 | 31.3 | 37.0 | 48.2 | 60.8 | 67.1 |

*Comparative example

TABLE 4b

Same series of compositions as shown in Table 3c but including additionally Luminova masterbatch

| Composition # | 25* | 26 | 27 | 28 | 29 | 30* |
|---|---|---|---|---|---|---|
| PC/PDMS-1 [wt %] | 30 | 24 | 18 | 12 | 6 | |
| PC-1 [wt %] | 70 | 56 | 42 | 28 | 14 | |
| PC/PDMS-2 [wt %] | | 20 | 40 | 60 | 80 | 100 |
| Additives | 0.2 | 0.2 | 0.2 | 0.2 | 0.2 | 0.2 |
| Luminova MB [wt %] | 3 | 3 | 3 | 3 | 3 | 3 |
| Izod Notched Impact @ 23° C. [kJ/m2] | 50 | 52 | 49 | 49 | 48 | 41 |
| Izod Notched Impact @ −30° C. [kJ/m2] | 26 | 25 | 23 | 23 | 21 | 18 |
| MVR 300 C/2.16 kg | 31.9 | 30.8 | 30.6 | 28.2 | 27.9 | 26.0 |
| Luminescence [mCd/m2] after 5 minutes | 27 | 35 | 33 | 32 | 31 | 26 |
| after 10 minutes | 13 | 16 | 16 | 16 | 14 | 13 |

*Comparative example

TABLE 4c

Same series of compositions as shown in Table 3c but including additionally red colorant

| Composition# | 31* | 32 | 33 | 34 | 35 | 36* |
|---|---|---|---|---|---|---|
| PC/PDMS -1 [wt %] | 30 | 24 | 18 | 12 | 6 | |
| PC-1 [wt %] | 70 | 56 | 42 | 28 | 14 | |
| PC/PDMS -2 [wt %] | | 20 | 40 | 60 | 80 | 100 |
| Additives | 0.2 | 0.2 | 0.2 | 0.2 | 0.2 | 0.2 |
| Red Colorant [wt %] | 0.2 | 0.2 | 0.2 | 0.2 | 0.2 | 0.2 |
| Izod Notched Impact @ 23° C. [kJ/m2] | 57 | 56 | 59 | 58 | 56 | 51 |
| Izod Notched Impact @ −30° C. [kJ/m2] | 46 | 46 | 46 | 46 | 42 | 21 |
| MVR 300 C/2.16 kg | 23.2 | 23.4 | 22.3 | 21.8 | 20.7 | 20.1 |
| Chroma [C*] | 46.6 | 46.0 | 44.6 | 44.8 | 52.3 | 57.1 |

*Comparative example

The compositions with metal flake masterbatch (Table 4a) show that the degree of metallic appearance increases with increasing transmission and clearly demonstrate that the metallic appearance can be maximized depending on the desired impact by optimizing the siloxane domain size. For instance composition 21 versus comparative composition 19, shows an increase in delta L* from 26.4 to 37 at about equal impact performance.

The blends with luminova masterbatch (Table 4b) show a distinct optimum in strength of luminescence. Also the blends with red colorant (Table 4c) show that Chroma and impact can be maximized by optimizing average siloxane domain size.

In Table 5 another series of PC/PDMS-1, PC-1 compositions is given diluted with PC/PDMS-2 with equal siloxane content of 5.46 weight %, however, this time also including BPADP as phosphate flame retardant. In accordance with the results shown in Table 3c, again the remarkable effect of mixing with PC/PDMS-2 on final blend siloxane domain size is demonstrated allowing to vary Haze and Transmission, between 2 to 104 and 30 and 85%, respectively, at constant overall siloxane content. In this series of compositions with BPADP an even more pronounced effect of siloxane domain size on Izod notched impact is observed.

TABLE 5

Compositions with BPADP at constant at constant siloxane content of 5.46 weight %.

| Composition # | 37 | 38 | 39 | 40 | 41 | 42* |
|---|---|---|---|---|---|---|
| PC/PDMS-1 [wt %] | 27.30 | 21.84 | 16.38 | 10.92 | 5.46 | 0.00 |
| PC/PDMS-2 [wt %] | 0.00 | 18.20 | 36.40 | 54.60 | 72.80 | 91.00 |
| PC-1 [wt %] | 63.70 | 50.96 | 38.22 | 25.48 | 12.74 | 0.00 |
| BPADP [wt%] | 9.00 | 9.00 | 9.00 | 9.00 | 9.00 | 9.00 |
| Additives | 0.2 | 0.2 | 0.2 | 0.2 | 0.2 | 0.2 |
| Siloxane [wt %] | 5.46 | 5.46 | 5.46 | 5.46 | 5.46 | 5.46 |
| Transmission [%] | 30 | 39 | 46 | 58 | 74 | 85 |
| Haze | 104 | 94 | 74 | 38 | 9 | 2 |
| Average PDMS Domain size [nm] | 41 | 31 | 30 | 25 | 21 | 19 |
| Izod Notched Impact @ 23° C. [kJ/m2] | 52 | 46 | 34 | 10 | 8 | 7 |
| MVR 300 C/2.16 kg | 53.8 | 51.3 | 51.1 | 47.6 | 49.4 | 45.7 |

*Comparative example

The benefit of the possibility of controlling Haze and Transmission is further demonstrated by the results in Tables 6a and 6b, giving the very same series of compositions as shown in Table 5, but including additionally either 2 weight % metal flake master batch (Table 6a) or 9 weight % of metal flake SAN beads (Table 6b), per 100 part per weight of the compositions in Table 5.

Both series of compositions with metal flake masterbatch and metal flake SAN beads show that the degree of metallic appearance increases with increasing transmission and clearly demonstrate that the metallic appearance can be maximized depending on the desired impact performance by optimizing the siloxane domain size.

TABLE 6a

Same series of composition as shown in Table 5 but including additionally metal flake master batch

| Composition # | 43* | 44 | 45 | 46 | 47 | 48* |
|---|---|---|---|---|---|---|
| PC/PDMS-1 [wt %] | 27.30 | 21.84 | 16.38 | 10.92 | 5.46 | 0.00 |
| PC/PDMS-2 [wt %] | 0.00 | 18.20 | 36.40 | 54.60 | 72.80 | 91.00 |
| PC-1 [wt %] | 63.70 | 50.96 | 38.22 | 25.48 | 12.74 | 0.00 |
| BPADP [wt %] | 9.00 | 9.00 | 9.00 | 9.00 | 9.00 | 9.00 |
| Additives | 0.2 | 0.2 | 0.2 | 0.2 | 0.2 | 0.2 |
| Metal Flake Masterbatch [wt %] | 2 | 2 | 2 | 2 | 2 | 2 |
| Izod Notched Impact @ 23° C. [kJ/m2] | 21 | 19 | 16 | 11 | 7 | 7 |
| MVR 300 C/2.16 kg | 49.8 | 49.2 | 50.6 | 47.0 | 48.3 | 50.2 |
| degree of matallic [delta L*] | 29.9 | 37.7 | 43.5 | 52.1 | 61.5 | 65.7 |

*Comparitive example

TABLE 6b

Same series of compositions as shown in Table 5 but including additionally metal flake SAN beads.

| Composition # | 49* | 50 | 51 | 52 | 53 | 54* |
|---|---|---|---|---|---|---|
| PC/PDMS-1 [wt %] | 27.30 | 21.84 | 16.38 | 10.92 | 5.46 | 0.00 |
| PC/PDMS-2 [wt %] | 0.00 | 18.20 | 36.40 | 54.60 | 72.80 | 91.00 |
| PC-1 [wt %] | 63.70 | 50.96 | 38.22 | 25.48 | 12.74 | 0.00 |
| BPADP [wt %] | 9.00 | 9.00 | 9.00 | 9.00 | 9.00 | 9.00 |
| Additives | 0.2 | 0.2 | 0.2 | 0.2 | 0.2 | 0.2 |
| Metal Flake SAN bead | 9 | 9 | 9 | 9 | 9 | 9 |
| Izod Notched Impact @ 23° C. [kJ/m2] | 7.6 | 7.6 | 6.8 | 6.3 | 6.0 | 5.5 |
| Puncture Energy [J] | 26.2 | 23.9 | 21.0 | 19.3 | 18.4 | 11.9 |
| MVR 300 C/2.16 kg | 50.4 | 44.9 | 46.0 | 42.7 | 39.5 | 39.0 |
| degree of metallic [delta L*] | 11.4 | 14.1 | 21.5 | 27.2 | 32.2 | 38.6 |

*Comparitive example

In Table 7 a series of blends is given also including T-SAN and SAN. Again the advantage in degree of metallic is found, also in the presence of T-SAN and SAN.

TABLE 7

Compositions including T-SAN and SAN

| Composition # | 55 | 56 | 57 | 58 |
|---|---|---|---|---|
| PC/PDMS-1 [wt %] | 20.0 | 20.0 | 20.0 | 20.0 |
| PC/PDMS-2 [wt %] | 36.5 | 36.5 | 36.5 | 36.5 |
| PC-1 [wt %] | 25.3 | 24.8 | 25.3 | 24.8 |
| SAN [wt %][ | | | 4.0 | 4.0 |
| T-SAN [wt %] | | 0.5 | | 0.5 |
| BPADP [wt %] | 9.0 | 9.0 | 9.0 | 9.0 |
| Additives | 0.2 | 0.2 | 0.2 | 0.2 |
| Metal Flake SAN bead [wt %] | 9.0 | 9.0 | 5.0 | 5.0 |
| Siloxane [wt %] | 6.19 | 6.19 | 6.19 | 6.19 |
| Izod Notched Impact @ 23° C. [kJ/m2] | 7.1 | 7.5 | 7.3 | 8.5 |

TABLE 7-continued

Compositions including T-SAN and SAN

| Composition # | 55 | 56 | 57 | 58 |
|---|---|---|---|---|
| Puncture Energy @ 23° C. [J] | 18 | 22 | 31 | 39 |
| MVR 300 C/2.16 kg | 37.5 | 29.7 | 44.6 | 34.1 |
| degree of metallic [delta L*] | 23.0 | 21.4 | 16.9 | 12.7 |

*Comparative example

EXAMPLE II

A series of compositions has been prepared using the materials shown in Table 8.

TABLE 8

| Component | Description |
|---|---|
| PC/PDMS-1 | The same polycarbonate/polydimethylsiloxane copolymer as used in example I. |
| PC/PDMS-3 | A third polycarbonate/polydimethylsiloxane copolymer having about 5 weight percent siloxane based on the total weight of the copolymer, an absolute weight average molecular weight of about 23.500 g/mol, a light transmission of about >80% and a haze of about 2. |
| PC-2 | A bisphenol A polycarbonate made by an interfacial process with an absolute weight average molecular weight of about 30.500 g/mol, a light transmission of about 90% and a haze of about 1, obtained from GE Plastics. |
| BPADP | Bisphenol A bis(diphenylphosphate), or BPADP, commercially available from Albemarle under the tradename NcendX ™ P-30 |
| T-SAN | T-SAN, a drip retardant encapsulated poly(tetrafluorethylene), obtained from General Electric Plastics Europe, comprising 50 weight percent polystyrene acrylonitrile and 50 weight percent poly(tetrafluorethylene). |

Preparation of PC/PDMS-3

PC/PDMS-3 was made using the same preparation method as used for PC/PDMS-2, however using 450 grams instead of 550 grams of an eugenol capped siloxane.

All compositions further contain an additive package of 0.1 wt % of a phosphite stabilizer, tris(2,4-di-tert-butylphenylphosphite), commercially available as IRGAFOS® 168 from Ciba Specialty Chemicals, 0.1 wt % of a hindered phenol stabilizer, octadecyl-3-(3,5-di-tert-butyl-4-hydroxyphenyl)propionate, commercially available as IRGANOX® 1076 also from Ciba Specialty Chemicals, and 0.15 wt % of a mold release agent, pentaerythritol tetrastearate, commercially available as PETS G from Faci (>90 percent esterified).

All compositions are compounded on a Werner & Pfleiderer co-rotating twin screw extruder (25 millimeter screw) and subsequently are molded according to ISO294 on a ENGEL injection molding machine. Compositions with BPADP are compounded and molded at a temperature of 275° C. and 280° C., repectively. All others are compounded and molded at a temperature of 300° C. and 310° C., respectively.

The compositions were tested for the following properties:
1) Haze and transmission: according to ASTM D1003 using a Gardner Haze Guard Dual, on 3.2 millimeter thick molded plaques. In the priority document the thickness has been indicated erroneously as 4.0 mm).
2) Izod Notched Impact strength was measured according to ISO180-IA on 4 millimeter thick test bars and at various temperatures.
3) Melt Volume rate, MVR, was tested according to ISO 1133 at 300° C. using a weight of 1.2 kilograms.

In Table 9a, a comparative series of compositions of PC/PDMS-1 and PC-2 is given with an increasing PC-2 content and decreasing PC/PDMS-1 content. In accordance with the results given in Example I, Table 3a, results show that diluting of PC-PDMS-1 with PC-2 is very ineffective in increasing Transmission or reducing Haze and a substantial reduction in PC-PDMS content is needed inevitably resulting in a substantial reduction in low temperature Izod Notched Impact.

TABLE 9a

PC/PDMS-1 diluted with PC-2

| Composition # | 59* | 60* | 61* | 62* | 63* |
|---|---|---|---|---|---|
| PC/PDMS-1 [wt %] | 24.91 | 18.68 | 12.46 | 6.23 | |
| PC-2 [wt %] | 74.74 | 80.97 | 87.19 | 93.42 | 99.65 |
| Additives [wt %] | 0.35 | 0.35 | 0.35 | 0.35 | 0.35 |
| Siloxane [wt %] | 4.98 | 3.74 | 2.49 | 1.25 | 0.00 |
| Transmission [%] | 23 | 25 | 32 | 40 | 91 |
| Haze | 104 | 104 | 104 | 98 | 1 |
| Izod Notched Impact @ −30° C. [kJ/m2] | 60 | 62 | 60 | 19 | 11 |
| MVR 300° C. @ 1.2 kg [cm3/10 min] | 8.0 | 8.3 | 8.8 | 9.3 | 9.8 |

*Comparative example

TABLE 9b

PC/PDMS-1 diluted with PC/PDMS-3 and PC-2

| Composition # | 59* | 64 | 65 | 66 | 67* | 68 |
|---|---|---|---|---|---|---|
| PC/PDMS-1 [wt %] | 24.91 | 18.68 | 12.46 | 6.23 | | 24.91 |
| PC-2 [wt %] | 74.74 | 56.05 | 37.37 | 18.68 | | |
| PC/PDMS-3 [wt %] | | 24.92 | 49.83 | 74.74 | 99.65 | 74.74 |
| Additives [wt %] | 0.35 | 0.35 | 0.35 | 0.35 | 0.35 | 0.35 |
| Siloxane [wt %] | 4.98 | 4.98 | 4.98 | 4.98 | 4.98 | 8.72 |
| Transmission [%] | 23 | 29 | 36 | 60 | 84 | 32 |
| Haze | 104 | 103 | 94 | 28 | 2 | 97 |
| Izod Notched Impact @ −30° C. [kJ/m2] | 60 | 60 | 57 | 51 | 20 | 51 |
| MVR 300° C. @ 1.2 kg [cm3/10 min] | 8.0 | 9.3 | 11.4 | 13.6 | 16.7 | 11.4 |

*Comparative example

In Table 10 another series of PC/PDMS-1 compositions is given diluted with PC/PDMS-3 or PC/PDMS-3 and PC-2 keeping the total siloxane content constant at 4.5 weight %, however, this time also including BPADP as phosphate flame retardant and T-SAN as drip retardant. In accordance with the results shown in Table 9b, again the remarkable effect of mixing with PC/PDMS-3 is demonstrated allowing to vary Haze and Transmission, between 1 to 104 and 24 to 85%, respectively. In accordance with the results in Example I, Table 5, in this series of Flame retarded compositions an even more pronounced effect on Izod notched impact is observed.

TABLE 10

Compositions including BPADSP and T-SAN

| Composition# | 69* | 70 | 71 | 72 | 73* | 74* | 75 | 76* | 77* | 78 |
|---|---|---|---|---|---|---|---|---|---|---|
| PC/PDMS-1 [wt %] | 22.41 | 16.81 | 11.21 | 5.60 | | 22.36 | 11.18 | | 22.36 | 22.36 |
| PC-2 [wt %] | 67.24 | 50.43 | 33.62 | 16.81 | | 67.09 | 33.54 | | 67.09 | |
| PC/PDMS-3 [wt %] | | | 22.41 | 44.83 | 67.24 | 89.65 | | 44.73 | 89.45 | | 67.09 |
| BPADP [wt %] | 10 | 10 | 10 | 10 | 10 | 10 | 10 | 10 | 10 | 10 |
| T-SAN [wt %] | | | | | | 0.20 | 0.20 | 0.20 | 0.20 | 0.20 |
| Additives [wt %] | 0.35 | 0.35 | 0.35 | 0.35 | 0.35 | 0.35 | 0.35 | 0.35 | 0.35 | 0.35 |
| Siloxane [wt %] | 4.48 | 4.48 | 4.48 | 4.48 | 4.48 | 4.47 | 4.47 | 4.47 | 4.47 | 7.83 |
| Transmission [%] | 24 | 31 | 42 | 66 | 85 | 24 | 39 | 71 | 24 | 36 |
| Haze | 104 | 102 | 77 | 19 | 1 | 104 | 89 | 39 | 104 | 92 |
| Izod Notched Impact 23° C. [kJ/m2] | 72 | 62 | 10 | 9 | 7 | 64 | 16 | 6 | 63 | 27 |
| MVR 300° C./1.2 kg [cm3/10 min] | 19.2 | 22.6 | 27.3 | 34.3 | 42.5 | 19.5 | 26.3 | 41.0 | 19.1 | 27.7 |

*Comparative example

In Table 9b, a series of compositions is given with the same PC/PDMS-1 contents as the series of compositions in Tables 9a, but diluted with PC/PDMS-3 or PC/PDMS-3 and PC-2 keeping the total siloxane content constant at 5 weight %. In accordance with the results of Example I, Table 3b and c, again the remarkable effect of mixing with PC/PDMS-3 is demonstrated allowing to vary Haze and Transmission, between 2 to 104 and 23 to 84%, respectively, while maintaining good low temperature impact properties.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out

What is claim is:

1. A thermoplastic composition comprising a matrix of a polycarbonate polymer in which are embedded polysiloxane domains with an average domain size between 20 and 45 nanometers.

2. The composition of claim 1 comprising a mixture at least one polycarbonate/poly(diorganosiloxane) copolymer.

3. The composition of claim 1 with polysiloxane chains having an average molecular chain length of greater than or equal to about ten siloxane units.

4. The composition of claim 1 with a polydimethyl siloxane content of 1–15 percent by weight or a corresponding molar content of another polydiorgano siloxane calculated with respect to the total weight of the composition.

5. A thermoplastic composition comprising a matrix of a polycarbonate polymer in which are embedded polysiloxane domains with an average domain size between 20 and 45 nanometers; and
 a visual effects additive.

6. The composition of claim 5 wherein the visual effects additive is encapsulated in a thermoplastic or thermoset encapsulant.

7. The composition of claim 5 wherein the visual effects additive is at least one metallic flake or colorant, or combinations thereof.

8. The composition of claim 7 wherein the metallic flake has a high aspect ratio.

9. The composition of claim 8 wherein the metallic flake is an aluminum flake.

10. A thermoplastic composition comprising a matrix of a polycarbonate polymer in which are embedded polysiloxane domains with an average domain size between 20 and 45 nanometers; and
 a polycarbonate resin, an anti-drip agent, a flame retardant, a styrene acrylonitrile polymer, a cycloaliphatic polyester, an impact modifier, or an ABS rubber, or combinations thereof.

11. A thermoplastic composition comprising a first polycarbonate/poly(diorganosiloxane) copolymer having a first light transmittance and a first haze and a second polycarbonate/poly(diorganosiloxane) copolymer having a second light transmittance and a second haze, wherein the first haze and the second haze have an absolute difference of at least about 50 and/or wherein the first light transmittance and the second light transmittance have an absolute difference of at least about 10%.

12. A thermoplastic composition comprising a first polycarbonate/poly(diorganosiloxane) copolymer having a first light transmittance and a first haze and a second polycarbonate/poly(diorganosiloxane) copolymer having a second light transmittance and a second haze, wherein the first haze and the second haze have an absolute difference of at least about 50 and/or wherein the first light transmittance and the second light transmittance have an absolute difference of at least about 10%; and further comprising a visual effects additive.

13. The composition of claim 12 wherein the visual effects additive is encapsulated in a thermoplastic or thermoset encapsulant.

14. The composition of claim 12 wherein the visual effects additive is at least one metallic flake or colorant, or combinations thereof.

15. The composition of claim 14 wherein the metallic flake has a high aspect ratio.

16. The composition of claim 15 wherein the metallic flake is an aluminum flake.

17. The composition of claim 11 further comprising a polycarbonate resin, an anti-drip agent, a flame retardant, a styrene acrylonitrile polymer, a cycloaliphatic polyester, an impact modifier, or an ABS rubber, or combinations thereof.

18. A thermoplastic composition comprising a first polycarbonate/poly(diorganosiloxane) copolymer having a first light transmittance of 0 to about 55% and a first haze from about 45 to about 104 and a second polycarbonate/poly(diorganosiloxane) copolymer having a second light transmittance of about 55 to about 100% and a second haze of 0 to about 45 wherein the first haze does not equal the second haze and/or wherein the first light transmittance does not equal the second light transmittance.

19. The composition of claim 18 further comprising a visual effects additive.

20. The composition of claim 19 wherein the visual effects additive is encapsulated in a thermoplastic or thermoset encapsulant.

21. The composition of claim 19 wherein the visual effects additive is at least one metallic flake or colorant, or combinations thereof.

22. The composition of claim 21 wherein the metallic flake has a high aspect ratio.

23. The composition of claim 22 wherein the metallic flake is an aluminum flake.

24. The composition of claim 18 further comprising a polycarbonate resin, an anti-drip agent, a flame retardant, a styrene acrylonitrile polymer, a cycloaliphatic polyester, an impact modifier, or an ABS rubber, or combinations thereof.

25. An article comprising the composition of claim 1.

26. A method of obtaining a desired degree of translucency in a thermoplastic composition comprises combining in specific relative quantities a first polycarbonate/poly(diorganosiloxane copolymer) having a first light transmittance and a first haze with a second polycarbonate/poly(diorganosiloxane) copolymer having a second light transmittance and a second haze, wherein the first haze is not equal to the second haze and/or the first light transmittance is not equal to the second light transmittance and the composition has a light transmittance of about 25 to about 85% and a haze less than about 104.

* * * * *